(12) United States Patent
Wada et al.

(10) Patent No.: US 7,417,353 B2
(45) Date of Patent: Aug. 26, 2008

(54) ON-VEHICLE ALTERNATOR WITH BRUSH/SLIP RING STRUCTURE

(75) Inventors: Hitoshi Wada, Fuwa-gun (JP); Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/444,315

(22) Filed: Jun. 1, 2006

(65) Prior Publication Data

US 2006/0273685 A1 Dec. 7, 2006

(30) Foreign Application Priority Data

Jun. 1, 2005 (JP) ............................ 2005-160838

(51) Int. Cl.
*H02K 5/10* (2006.01)
*H02K 5/12* (2006.01)
*H02K 13/00* (2006.01)

(52) U.S. Cl. ........................... 310/239; 310/88; 310/89

(58) Field of Classification Search ................. 310/239, 310/88
See application file for complete search history.

(56) References Cited

U.S. PATENT DOCUMENTS

| | | | | |
|---|---|---|---|---|
| 2,279,961 | A * | 4/1942 | Whittaker | 454/184 |
| 2,990,105 | A * | 6/1961 | Van Rijn | 417/423.1 |
| 4,387,314 | A * | 6/1983 | Iwaki et al. | 310/88 |
| 4,491,754 | A * | 1/1985 | Gotoh | 310/88 |
| 4,959,576 | A | 9/1990 | Horibe et al. | |
| 4,961,016 | A * | 10/1990 | Peng et al. | 310/62 |
| 5,424,600 | A * | 6/1995 | Ishikawa et al. | 310/220 |
| 6,215,216 | B1 * | 4/2001 | Miyamoto et al. | 310/89 |
| 6,294,856 | B1 | 9/2001 | Ishida et al. | |
| 6,586,853 | B2 * | 7/2003 | Ishida et al. | 310/62 |
| 2002/0047470 | A1 * | 4/2002 | Shioya et al. | 310/239 |
| 2002/0140314 | A1 * | 10/2002 | Tsuge | 310/239 |

FOREIGN PATENT DOCUMENTS

| | | | |
|---|---|---|---|
| DE | 1 763 866 | A | 12/1971 |
| DE | 25 06 184 | B2 | 8/1975 |
| DE | 42 38 564 | C2 | 5/1994 |
| DE | 199 50 126 | A1 | 5/2000 |
| DE | 101 52 810 | A1 | 5/2003 |
| EP | 412645 | A1 * | 2/1991 |
| EP | 0 671 802 | A1 | 9/1995 |
| JP | 58-051663 | U | 4/1983 |

(Continued)

*Primary Examiner*—Darren Schuberg
*Assistant Examiner*—Alex W Mok
(74) *Attorney, Agent, or Firm*—Oliff & Berridge, PLC (57) ABSTRACT

An alternator (AC generator) to be mounted on a vehicle comprises slip rings, brushes, a brush holder, a rear cover, and sealing members. The slip rings are fixed on a rotary shaft and rotatable together with the rotary shaft. The brushes are slidable on the slip rings and the brush holder accommodates the brushes therein. The slip-ring cover covers the slip rings as well as the brush holder and the rear cover covers electronic components including the brushes. The sealing members give a sealing performance to an inner space containing slid portions of the brushes on the slip rings. The rear cover, the brush holder, and the sealing member have a ventilating passage for positively causing an flow of air from the inner space containing the slid portions of the brushes on the slip rings to an outside of the alternator.

18 Claims, 6 Drawing Sheets

FOREIGN PATENT DOCUMENTS

| | | | |
|---|---|---|---|
| JP | 01099451 A | * | 4/1989 |
| JP | 01-274643 A | | 11/1989 |
| JP | 05-199701 A | | 8/1993 |
| JP | 07-032571 B2 | | 4/1995 |
| JP | 2000-139058 A | | 5/2000 |
| JP | 2002142423 A | * | 5/2002 |

* cited by examiner

ON-VEHICLE ALTERNATOR WITH BRUSH/SLIP RING STRUCTURE

CROSS-REFERENCE TO RELATED APPLICATION

This application is based on and claims the benefit of priority from earlier Japanese Patent Application No. 2005-160838 filed on Jun. 1, 2005, the description of which is incorporated herein by reference.

BACKGROUND OF THE INVENTION

1. Technical Field of the Invention

The present invention relates to an alternator (on-vehicle AC generator) which Is mounted on an engine installed in vehicles such as automobiles and trucks, and in particular, to an alternator equipped with a brush and slip ring structure to deliver the power.

2. Related Art

Most engine-driven vehicles are generally equipped with alternators (on-vehicle AC generators), which generate power responsively to the rotation of the engines. Generally known conventional alternators are generally equipped with a rotary shaft and a pair of stator and rotor covered by a housing. The rotary shaft fixedly passes the rotator, so that both the rotary shaft and the rotor can rotate together around a central longitudinal axis passing the sectional center of the rotary shaft. The rotator is located inside the stator in the radial direction of the stator and is opposed to the stator with a predetermined clearance therebetween. Cooling fans are secured on the rotator and generate cooling wind by the rotation of the rotator. Thus rotating the rotary shaft allows the cooling fan to generate the cooling wind, and the generated cooling wind Is discharged through a discharge window formed through the housing. The slip rings are fixedly secured on the rotary shaft for rotation together with the rotation of the rotary shaft and the brushes are disposed within the housing to slide on the slip rings. The brushes are accommodated in a brush holder. A rear cover is also provided to cover electric components including the brushes.

In this kind of conventional on-vehicle alternators, there are provided various improvements in relation to the brushes and/or the slip rings. For example, Japanese Utility Model Laid-open Publication 58-51663 provides a brush holder with an end face formed to have labyrinth-like grooves with plural bent portions, thus securing air-ventilating passages and preventing brushes from being watered. This measure is taken to suppress abrasion of the brushes due to an Increase in the temperature thereof. Further, Japanese Patent Publication (examined) No. 7-32571 provides an arrangement of shielding members between a brush holder and a rear cover, where the shielding members have cooling-air passages. Japanese Patent Laid-open Publication No. 5-199701 shows shielding members with cooling-air passages having a labyrinth-like form including plural bent portions. In addition, Japanese Patent Laid-open Publication No. 2000-139058 teaches a mechanism In which a slip ring cover is partly inserted into a recess of a brush holder so as to form a labyrinth structure.

However, the above various structures disclosed by the conventional references have faced a concern that foreign matters (e.g., mud, dust, water) cannot be prevented well from coming into an inner space in which the brushes are positioned. This concern is especially true of off-road vehicles, because such off-road vehicles are frequently made to run on rough roads. If such foreign matters are allowed to come into the inner space, there arises a problem that environmental resistance of the brushes is weakened. One counter measure for this problem could be to Install a foreign-matter-proof casing (such as water-proof casing) in a vehicle in such a manner that the casing covers an alternator without openings. However, this installation has a further difficulty, because passages for charging and discharging cooling air should be left, and thus difficult to prevent foreign matters (such as water) from coming in. Installing the above casing also increases costs for manufacturing alternators.

Hence, there has been a demand for alternators which can be produced with lower manufacturing costs, a relatively simple structure to prevent foreign matters from coming in so that the environmental resistance performance of the alternator is enhanced.

On the other hand, when, in the inner space containing the brushes, powder dust is caused by slide operations between the brushes and the slip rings, it is desired that the powder dust is smoothly discharged outside.

SUMMARY OF THE INVENTION

The present invention has been made in view of the situations described above, and has an object of providing an alternator that has the capability of easily promoting the discharge of inside-caused dust matters to the outside of the alternator.

Moreover, the present invention has another object of providing an alternator that has the capability of, in addition to the above promotion, preventing foreign matters from coming to brushes whatever the alternator is installed to various types of vehicles, Thus the brushes have a higher environmental resistance performance in various kinds of road conditions.

As one aspect of the present invention, there is provided an alternator to be mounted on a vehicle, comprising: slip rings fixed on a rotary shaft and rotatable together with the rotary shaft; brushes slidable on the slip rings; a brush holder accommodating the brushes therein; a slip-ring cover covering the slip rings as well as the brush holder; and a rear cover covering electronic components Including the brushes and having a first air-ventilating port for communicating between an inner space containing slid portions of the brushes on the slip rings and an outside of the alternator and a second air-ventilating port for communicating between an inner space containing the brushes within the brush holder and the outside of the alternator.

Hence, thanks to the first and second air-ventilating ports, a ventilating passage communicating, at least, between the inner space containing the slid portions of the brushes on the slip rings to an outside of the alternator is formed. The second air-ventilating port is able to take air into the inner space containing the brushes, thus positively help the air flow out from the inner space containing the slid portions of the brushes toward the outside of the alternator. Accordingly, the ventilating passage positively causes a flow of air to pass from the inner space containing the slid portions of the brushes on the slip rings to an outside of the alternator. The discharge of inside-caused dust matters to the outside of the alternator is promoted. For example, such dust matters are powder dust generated by the slide operations of the brushes on the slip rings. When the first air-ventilating port is assigned to the air discharge port and the second one is assigned to the air-intake port, a flow of air is generated from the second air-ventilating port to the first air-ventilating port. Hence such power dust is well discharged through the first air-ventilating port.

It is preferable that the alternator further comprise sealing members giving a sealing performance to the inner space containing the slid portions of the brushes on the slip rings, one of the sealing members being placed between the brush holder and the rear cover, wherein the sealing member placed between the brush holder and the rear cover has first and second through holes communicating to the first and second air-ventilating ports, respectively.

Hence, in addition to the advantage that the inside-caused dust matters are promoted to be discharged outside, the sealing members prevent foreign matters from reaching brushes, whatever the alternator is installed to various types of vehicles, so that the brushes have a higher environmental resistance performance in various kinds of road conditions.

A second aspect of the present invention is to provide an alternator to be mounted on a vehicle, comprising: slip rings fixed on a rotary shaft and rotatable together with the rotary shaft; brushes slidable on the slip rings; a brush holder accommodating the brushes therein; a slip-ring cover covering the slip rings as well as the brush holder; a rear cover covering electronic components including the brushes; and ventilating means for positively causing a flow of air from an inner space containing slid portions of the brushes on the slip rings to an outside of the alternator.

A third aspect of the present invention is to provide an alternator to be mounted on a vehicle, comprising: slip rings fixed on a rotary shaft and rotatable together with the rotary shaft; brushes slidable on the slip rings; a brush Colder accommodating the brushes therein; a slip-ring cover covering the slip rings as well as the brush holder; a rear cover covering electronic components including the brushes; sealing members giving a sealing performance to an inner space containing slid portions of the brushes on the slip rings; wherein the rear cover, the brush holder, and the sealing member have a ventilating passage for positively causing an flow of air from the inner space containing the slid portions of the brushes on the slip rings to an outside of the alternator.

The second and third aspects of the present invention also provide an advantage in that the discharge of inside-caused dust matters toward the outside of the alternator is promoted.

DETAILED DESCRIPTION OF THE PREFERRED EMBODIMENTS

Referring to FIGS. 1 to 6, an alternator to be mounted on a vehicle (on-vehicle AC alternator) according to an embodiment of the present invention will now be described.

Figure 1:
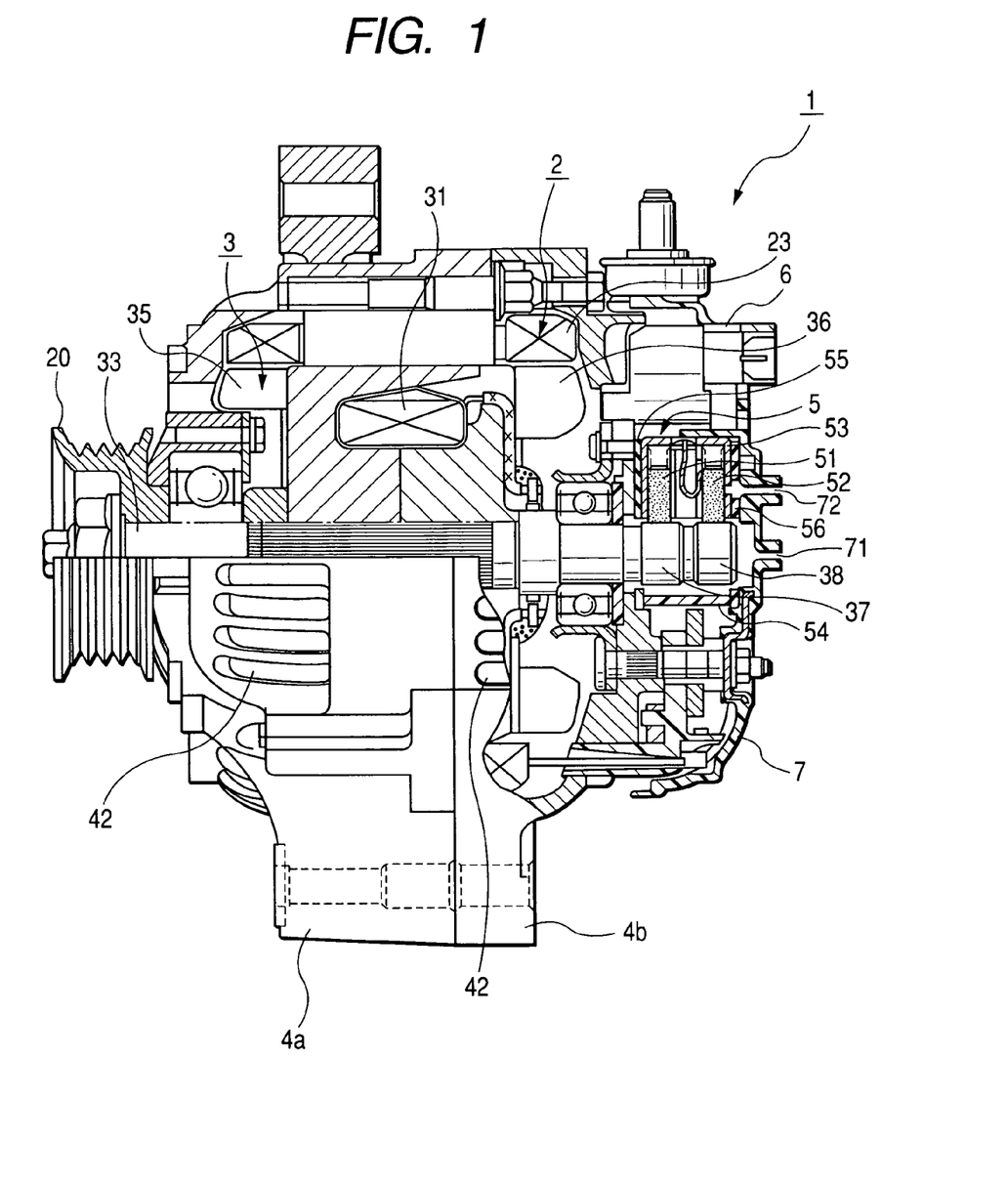
FIG. 1 is a partly broken sectional view showing the internal structure of an alternator (on-vehicle AC generator) in an axial direction thereof according to an embodiment of the present Invention.
Figure 2:
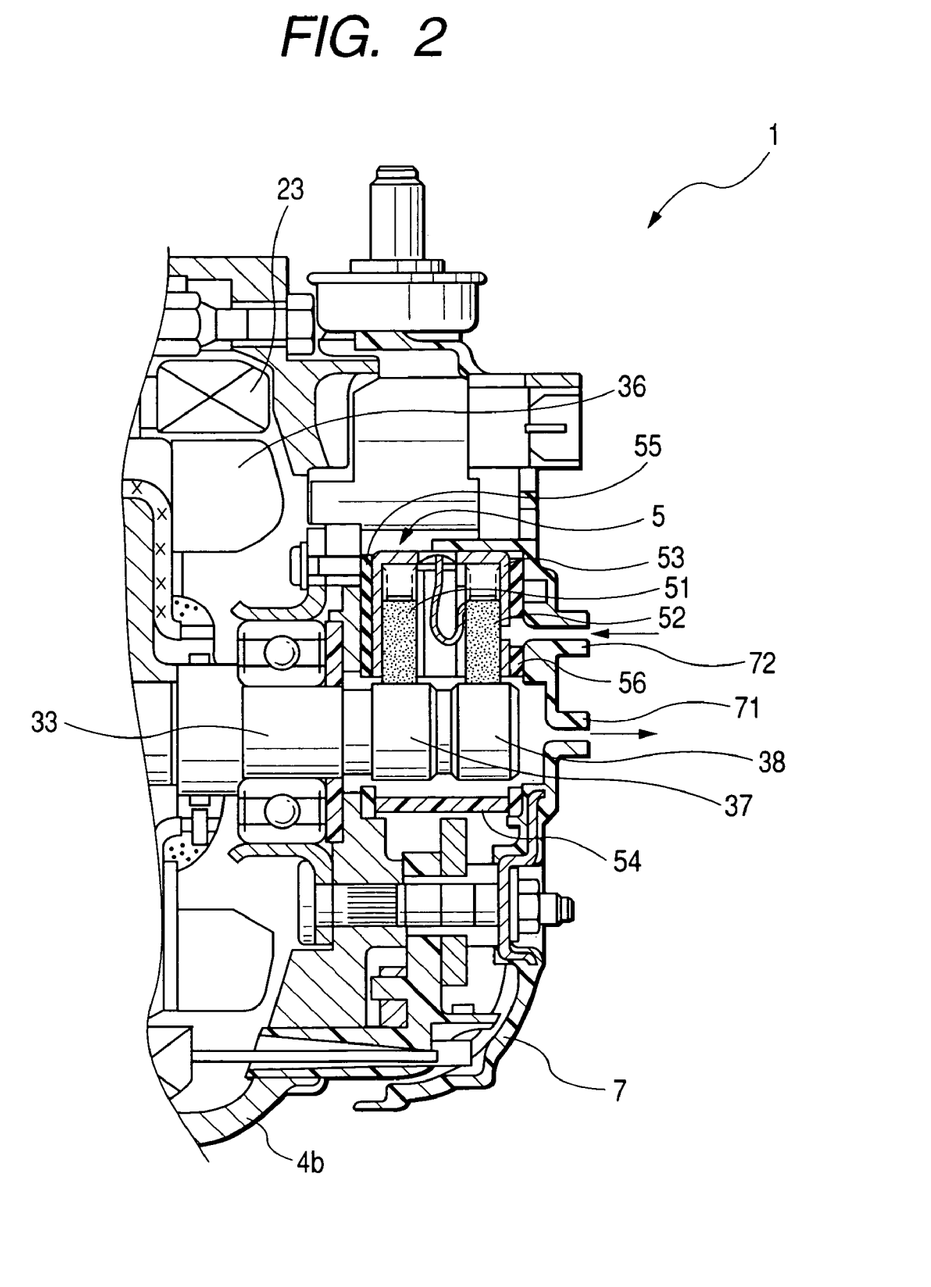
FIG. 2 is a partial enlarged view of an essential part showing the concept of the present invention adopted by the alternator according to the embodiment.

FIG. 1 shows a cross section of an on-vehicle alternator of the embodiment. FIG. 2 is an enlarged cross section of a principal part of an on-vehicle alternator of the embodiment. As shown in FIG. 1, an on-vehicle alternator 1 of the present embodiment includes a stator 2 around which an armature winding 23 is wound about, a rotor 3 which is disposed at an inner periphery of the stator 2 so as to face the stator 2, with a field winding 31 being wound thereabout, cooling fans 35 and 36 serving as cooling air generating means, each being fixed to each of axial end faces of the rotor 3 to generate cooling air as the rotor 3 rotates, a front-side housing 4a and a rear-side housing 4b for holding the stator 2 and the rotor 3, a brush apparatus 5 for supplying electric power to the field winding 31, a voltage control apparatus 6 for controlling output voltage at a predetermined value, a rear cover 7 for covering electrical components, such as the brush apparatus 5 and the voltage control apparatus 6 for protection from foreign matters, and a pulley 20 for transmitting turning/driving force to the rotor 3 from an engine (not shown).

The front-side housing 4a is provided, on its side, with a plurality of windows 42 for discharging cooling air. These windows 42 are provided for the purpose of discharging cooling air that has been generated with the rotation of the cooling fan 35 on the side of the pulley 20 and flows in the centrifugal direction, to the outside of the front-side housing 4a. Further, the rear-side housing 4b is provided, on its side, with a plurality of windows 42 for discharging cooling air, These windows 42 are provided for the purpose of discharging cooling air that has been generated with the rotation of the cooling fan 36 on the side of the rear cover 7 and flows in the centrifugal direction, to the outside of the rear-side housing 4b.

A rotary shaft 33 of the rotor 3 is fixedly provided, at an end thereof, with slip rings 37 and 38 which integrally rotate with the rotary shaft 33. The brush apparatus 5 Includes a brush holder 53 for accommodating two brushes 51 and 52, which are slidably in contact with the slip rings 37 and 38, respectively, a slip ring cover 54 for covering the outer periphery of the slip rings 37 and 38 together with the brush holder 53, and two sealing members 55 and 56 which are disposed at axial ends of the brush holder 53 and the slip ring cover 54 at the time of assembling to enhance a sealing performance (airtightness) of a space formed around the slip rings 34 and 38. These sealing members 55 and 56 are made up of a plate-like rubber material.

The rear cover 7 is attached in such a manner that electrical components including the brushes 51 and 52, in particular, the brush apparatus 5, the voltage control apparatus 6 and the like attached to the outside of the rear-side housing 4b, are covered for protection from foreign matters. This rear cover 7 is made of a resin material and has first and second cylindrical air-ventilating ports 71 and 72 for charging and discharging air to and from the inside of the brush apparatus 5. In the present embodiment, the first air-ventilating port 71 is used for discharging air, and the second air-ventilating port 72 is used for charging air. The first and the second air-ventilating ports 71 and 72, and the surrounding structure are described in detail below.

Figure 3:
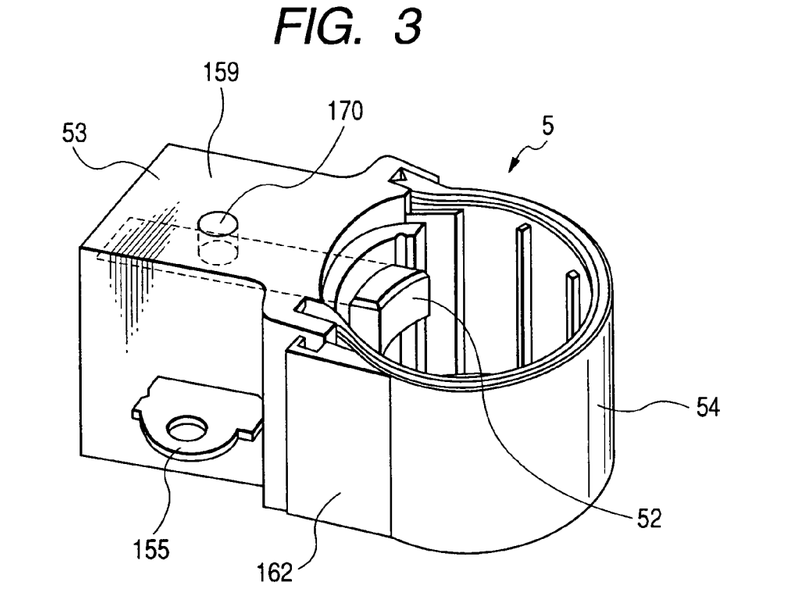
FIG. 3 is a perspective view of an assembly of a brush holder and a slip ring cover in the embodiment.
Figure 4:
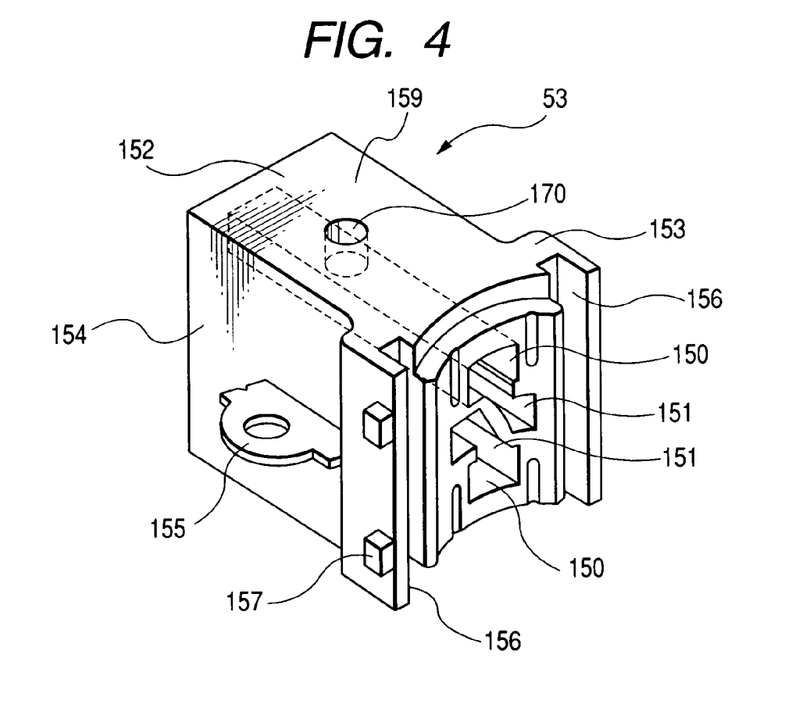
FIG. 4 is a perspective view of the brush holder into which brushes are assembled in the embodiment.
Figure 5:
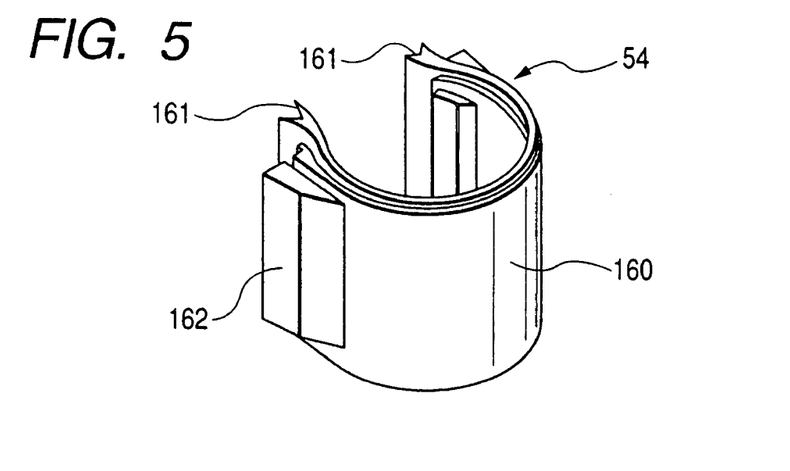
FIG. 5 is a perspective view showing the slip ring cover.
Figure 6:
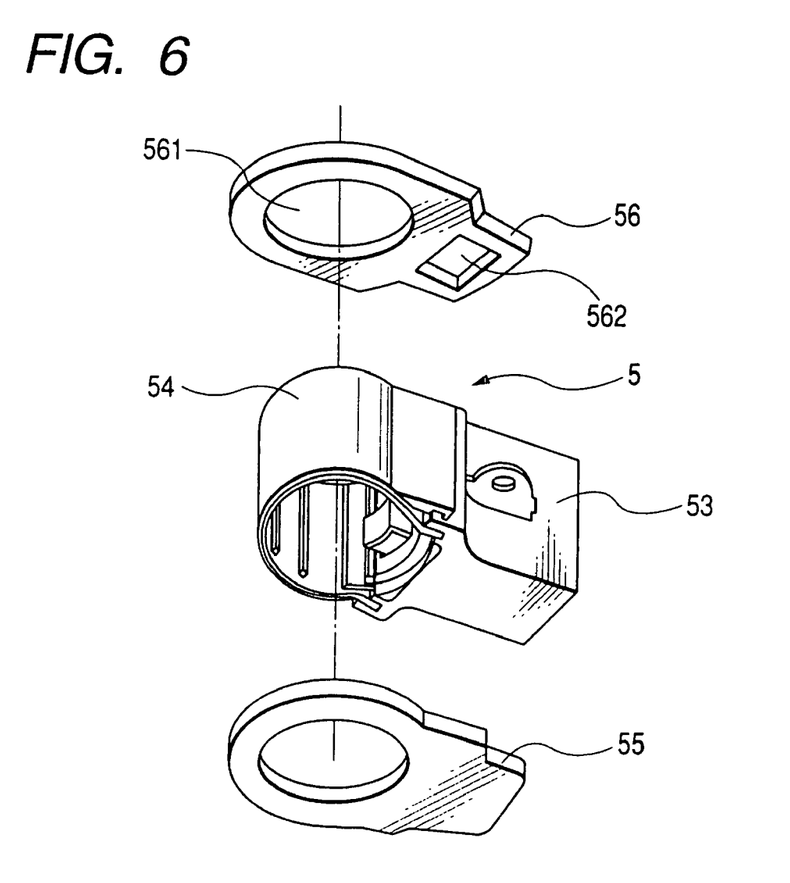
FIG. 6 is a perspective view showing the positional relationship among the brush holder, the slip ring cover, and sealing members to be attached to both the brush holder and slip ring cover.

FIG. 3 is a perspective view of the brush apparatus 5, in which an assembled state of the brush holder 53 and the slip ring cover 54 is shown. FIG. 4 is a perspective view of the brush holder 53 prior to the assembling of the brushes 51 and 52. FIG. 5 is a perspective view of the slip ring cover 54. FIG. 6 is a perspective view showing the positional relation of the sealing members 55 and 56 with the brush holder 53 and the slip ring cover 54.

The brush holder 53 made of a thermosetting resin is provided with a box 152 in which first accommodating portions (brush accommodating portions) 150 for accommodating the respective brushes 51 and 52, and second accommodating portions 151 for accommodating respective pigtails, are formed. In order to increase a surface area, one side of the box 152, on which the slip rings 37 and 38 are provided, has a large thickness portion 153 whose face is curved along outer peripheral surfaces of the slip rings 37 and 38. The brush holder 53 is formed by molding, integrating a positive electrode and a negative electrode, each made up of a metal plate, with their positive and negative terminals 155 being projected from respective both end faces 154 provided along the radial direction of the box 152. At each of both radial end portions of the curved face of the large thickness portion 153, a recess 156 having a rectangular cross section is formed throughout the entire axial length of the large thickness portion 153. Two projections 157 are formed on each radial end face of the large thickness portion 153. Further, a through hole 170 is formed at a substantially central portion of an upper surface 159 of the box 152 so as to communicate with the first accommodating portions 150.

The slip ring cover 54 is for covering and protecting the slip rings 37 and 38 formed at one end side of the rotary shaft 33. The slip ring cover 54 has a substantially cylindrical shape whose cross section along the radial direction provides an incomplete circular shape having about ¾ of the circumference, with about ¼ of the circumference being removed. Specifically, the slip ring cover 54 is constituted of a substantially cylindrical peripheral wall 160 made of a resin material (e.g., nylon) whose cross section forms an incomplete circle having about ¾ of the circumference. A projection 161 of a relatively small thickness extending in the axial direction and having a V-shaped cross section in the radial direction, is formed at each circumferential end portion of the peripheral wall 160, so as to be fitted into the recess 156 of the brush holder 53. Further, a hooked projection 162 is formed on the outside of each of the V-shaped recesses 161, so as to be engaged with the projections 157 of the brush holder 53.

As shown in FIG. 2, the first air-ventilating port 71 formed in the rear cover 7 is provided at a position where communication can be established from an inner space including brush-sliding portions of the slip rings 37 and 38 to the outside of the rear cover 7. The second air-ventilating port 72 is provided at a position where communication can be established from the first accommodating portions 150 to the outside of the rear cover 7. The second air-ventilating port 72 is formed at the same level as the through hole 170 which is formed on the upper surface 159 of the box 152 for the brush holder 53. Thus, the second air-ventilating port 72 and the through hole 170 form an air charging path connecting the first accommodating portions 150 of the brush holder 53 to the outside. Note that, as shown in FIG. 6, openings 561 and 562 are formed in one sealing member 56, at positions that align with the openings of the air-ventilating ports 71 and 72, respectively, As described above, the rear cover 7 of the on-vehicle alternator 1 of the present invention is provided with the first air-ventilating port 71 communicating from the brush-sliding portions of the slip rings 37 and 38 to the outside, and the second air-ventilating port 72 communicating from the first accommodating portions 150, i.e. brush accommodating portions of the brush holder S3 to the outside. Thus, air is charged and discharged to and from the inner space of the brush holder 53 through the first and second air-ventilating ports 71 and 72. In this way, entry of foreign matters into the vicinities of the brushes 51 and 52, which would be caused by the entry of water into the inside of the on-vehicle alternator 1, can be completely prevented. Moreover, the positions and the directions of the first and second air-ventilating ports 71 and 72 communicating with the inner space in the vicinities of the brushes 51 and 52 can be readily changed according to the vehicular circumstances. Accordingly, environmental resistance performance of the brushes can be remarkably enhanced.

As described above, the seal member 56 is interposed between the brush holder 53 and the rear cover 7 so as to achieve a sealing performance (airtightness) of the inner space around the brush-sliding portions, with the openings 561 and 562 being formed in the sealing member 56 to align with the first and second air-ventilating ports 71 and 72. In addition, the through hole 170 is formed in an end surface (upper surface 159) of the brush holder 53 so as to align with the second air-ventilating port 72 and to allow communication with the first accommodating portions 150. Thus, sealing is ensured between the brush holder 53 and the rear cover 7, while effectively preventing the entry of foreign matters and enhancing the environmental resistance performance.

Further, air can be charged from the second air-ventilating port 72 and discharged from the first air-ventilating port 71, as described above, to directly cool the brushes 51 and 52 with relatively low-temperature air, As a result, brush wear can be suppressed, and brush powder produced by the sliding movement of the brushes 51 and 52 can be discharged through the first air-ventilating port 71.

It should be appreciated that the present invention is not limited to the embodiment described above, but various modifications may be possible within the spirit of the present invention. In those modifications, the same or equivalent components to as or to those described in the foregoing embodiment will be given the same reference numerals for the sake of simplified explanations.

Figure 7:
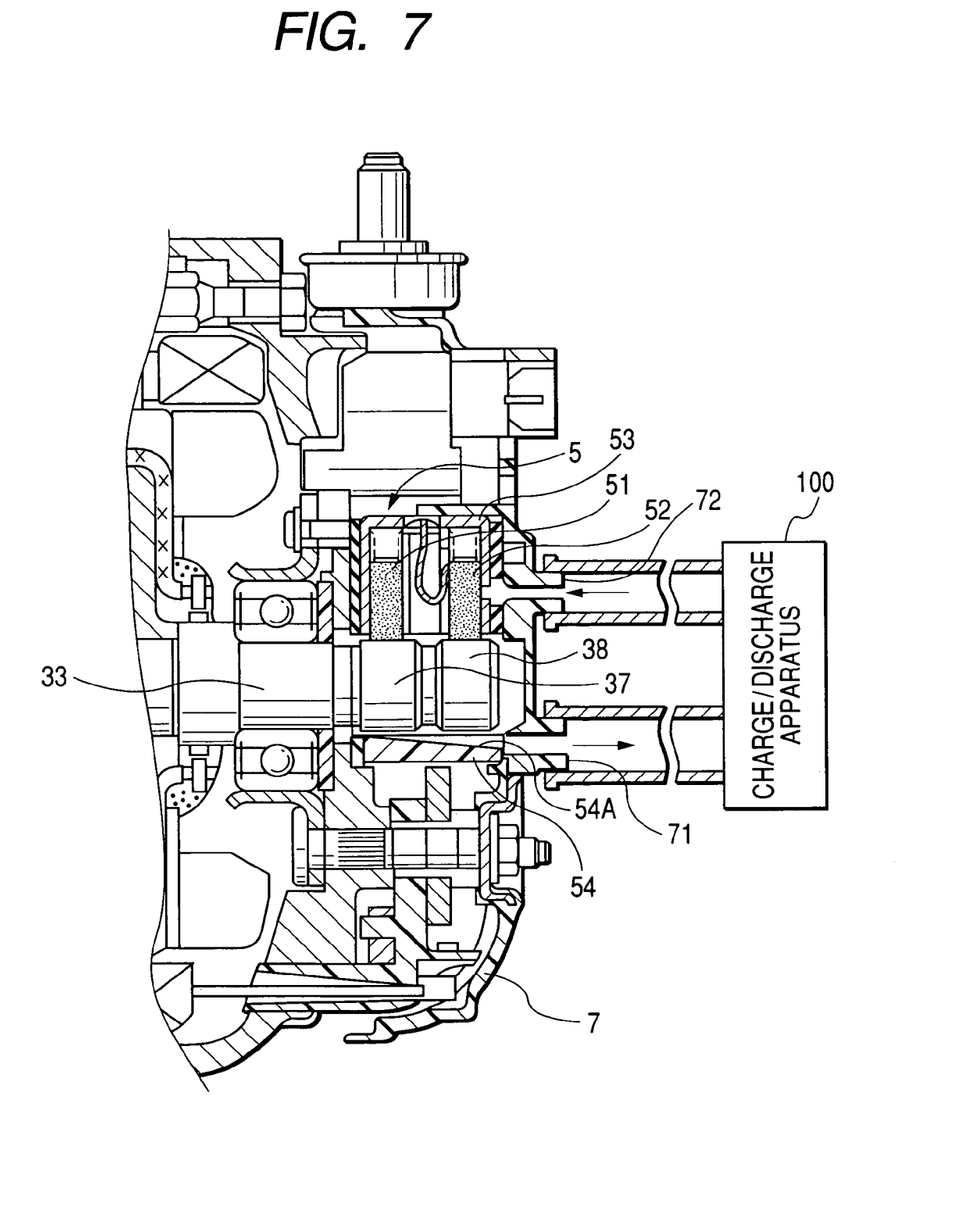
FIGS. 7 and 8 are partial views each showing a modification according to the present invention.

FIG. 7 is an enlarged view of a principal part of an on-vehicle alternator, which shows a modification in first and second air-ventilating ports and their surroundings. In the modification shown in FIG. 7, a slip ring cover 54 has an inner wall surface 54A, which is slanted by a predetermined angle with respect to a rotary shaft 33. In an alternator attitude where, as shown In FIG. 7, the rotary shaft 33 is disposed parallel to the ground, with the brushes 51 and 52 being positioned above the rotary shaft 33 and the slip ring cover 54 being positioned below the rotary shaft 33, the inner wall surface 54A of this slip ring cover 54 provides a gradually declining slant as it comes near to the rear cover 7. In the modified embodiment shown in FIG. 7, a first air-ventilating port 71 of a rear cover 7 is so formed as to align with the vicinity of an end of the slanted inner wall surface 54A (i.e., to align with a portion closely In contact with the rear cover 7). Thus, brush powder is allowed to move toward the first air-ventilating port 71, thereby achieving more reliable discharge.

As shown in FIG. 7, the first and the second air-ventilating ports 71 and 72 can be connected to a vehicle side charging/discharging apparatus 100 through tubular intermediate members to perform forcible charging/discharging. This enables reliable ventilation and discharge of brush powder with the operation of the charging/discharging apparatus 100. Thus, even in an environment of submerged condition, for example, effects of preventing entry of foreign matters and enhancing environmental resistance performance can be achieved. This modification is applicable to the structure shown in FIG. 2.

Figure 8:
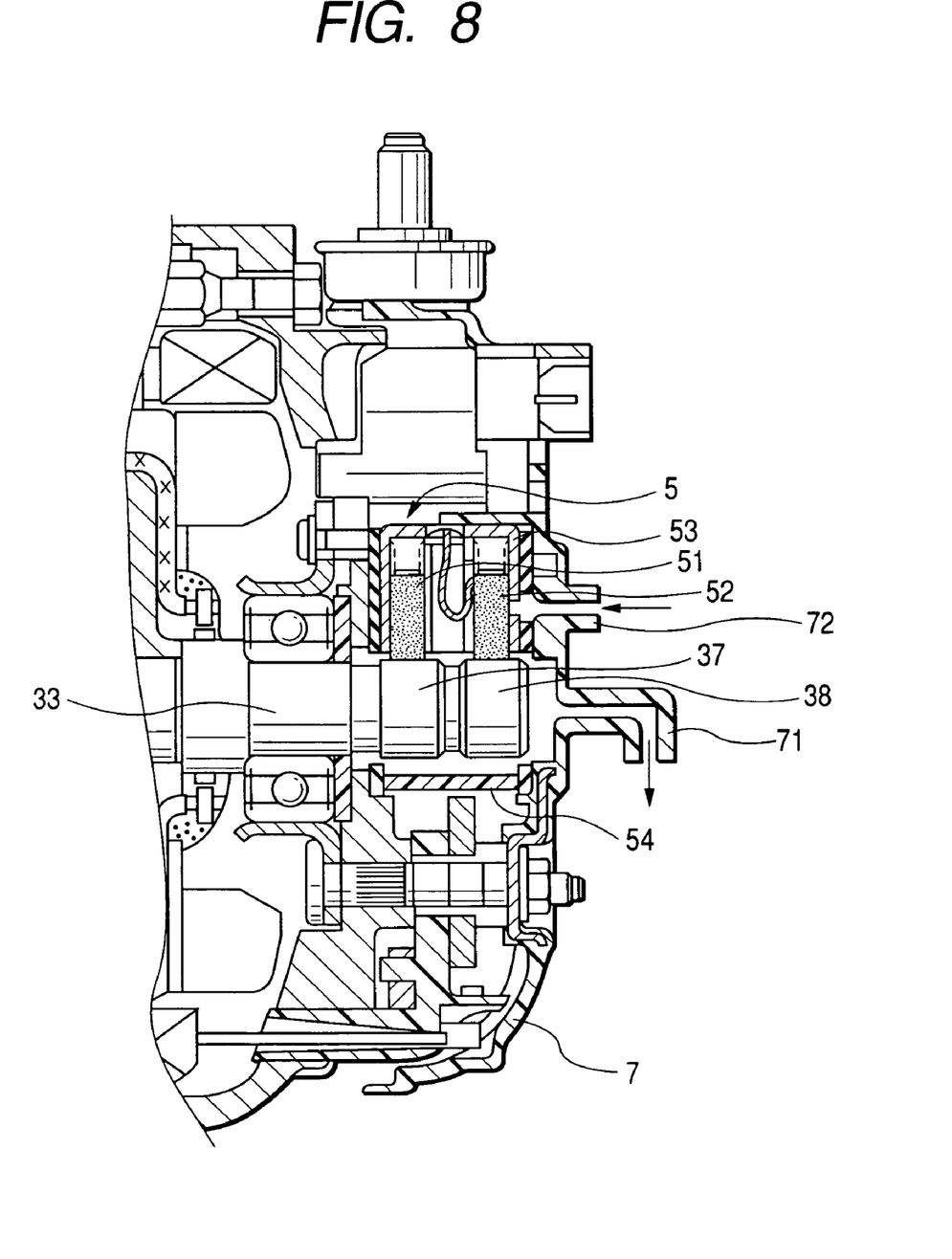

FIG. 8 is an enlarged view of a principal part of an on-vehicle alternator to show another modification of first and second air-ventilating ports and their surroundings. In the modification shown in FIG. 8, a direction of an opening of the first air-ventilating port 71 is differentiated from that of an opening of the second air-ventilating port 72. This arrangement eliminates the need for providing a windbreak wall that would be required in case the openings are oriented to the same direction.

The openings of the first and second air-ventilating ports 71 and 72 in the embodiments described above may be placed against an airflow which is generated when the vehicle is running. For example, the opening of the second air-ventilating port 72 on a charging side may be disposed toward the upstream of the airflow, and the first air-ventilating port 71 on a discharging side may be disposed toward the downstream of the airflow. In this way, good efficiency in charging/discharging operation can be achieved without using the charging/discharging apparatus 100 shown in FIG. 7.

The present invention may be embodied in other specific forms without departing from the spirit or essential characteristics thereof. The present embodiment and modifications are therefore to be, considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An alternator to be mounted on a vehicle, comprising:
   slip rings fixed on a rotary shaft and rotatable together with the rotary shaft;
   brushes slidable on the slip rings;
   a brush holder having a brush accommodating portion in which the brushes are accommodated, and having both sides in an axial direction of the rotary shaft, one of the sides having a through hole communicating the brush accommodating portion to an outside of the alternator;
   a slip-ring cover covering the slip rings as well as the brush holder; and
   a rear cover covering electronic components including the brushes and having a first air-ventilating port for communicating between an inner space containing slid portions of the brushes on the slip rings and the outside of the alternator and a second air-ventilating port for communicating between the brush accommodating portion and the outside of the alternator via the through hole of the brush holder.

2. The alternator according to claim 1, further comprising sealing members giving a sealing performance to the inner space containing the slid portions of the brushes on the slip rings, one of the sealing members being placed between the brush holder and the rear cover,
   wherein the sealing member placed between the brush holder and the rear cover has first and second openings communicating to the first and second air-ventilating ports, respectively.

3. The alternator according to claim 2, wherein the sealing members consist of a first sealing member and a second sealing member, the first sealing member serving as the sealing member having the first and second openings communicating to the first and second air-ventilating ports, respectively, and
   the first and second sealing members are arranged on sides of an assembly consisting of both the brush holder and the slip ring cover in an axial direction of the rotary shaft and are formed to have openings through which the rotary shaft passes, respectively, wherein the opening of the first sealing member for passing the rotary shaft serves as the first opening of the first sealing member.

4. The alternator according to claim 2, wherein the second air-ventilating port is assigned to charge air from the outside of the alternator and the first air-ventilating port is assigned to discharge of the air to the outside of the alternator.

5. The alternator according to claim 4, wherein the through hole connecting to the second air-ventilating port is positioned to be against an air flow to be caused in running of a vehicle in which the alternator is mounted.

6. The alternator according to claim 1, wherein the slip ring cover has an inner wall having an inclination to gradually increase, toward the first air-ventilating port, a section of an inner space formed by the slip ring cover in a radial direction of the rotary shaft.

7. The alternator according to claim 6, wherein the inclination of the inner wall of the slip ring cover has an end which is, substantially without gaps, connected to the first air-ventilating port.

8. The alternator according to claim 1, wherein the through hole connecting to the second air-ventilating port is positioned to be against an air flow to be caused in running of a vehicle in which the alternator is mounted.

9. The alternator according to claim 1, wherein the first and second air-ventilating ports respectively connect to a second through hole and the through hole, wherein air-ventilating directions of the through holes are mutually different from each other.

10. An alternator to be mounted on a vehicle, comprising:
    slip rings fixed on a rotary shaft and rotatable together with the rotary shaft;
    brushes slidable on the slip rings;
    a brush holder accommodating the brushes therein;
    a slip-ring cover covering the slip rings as well as the brush holder; and
    a rear cover covering electronic components including the brushes and having a first air-ventilating port for communicating between an inner space containing slid portions of the brushes on the slip rings and an outside of the alternator and a second air-ventilating port for communicating between an inner space containing the brushes within the brush holder and the outside of the alternator,
    wherein the first and second air-ventilating ports are coupled with an on-vehicle air charge and discharge device so as to have charge and discharge of the air from the device.

11. An alternator to be mounted on a vehicle, comprising:
    slip rings fixed on a rotary shaft and rotatable together with the rotary shaft;
    brushes slidable on the slip rings;
    a brush holder having a brush accommodating portion in which the brushes are accommodated, and having both sides in an axial direction of the rotary shaft, one of the sides having a through hole communicating the brush accommodating portion to an outside of the alternator;
    a slip-ring cover covering the slip rings as well as the brush holder;
    a rear cover covering electronic components including the brushes; and
    ventilating means for positively causing a flow of air via the through hole of the side of the brush holder from an inner space containing slid portions of the brushes on the slip rings to an outside of the alternator.

12. The alternator according to claim 11, wherein the ventilating means has a first air-ventilating port formed through the rear cover and formed to communicate between an inner space containing slid portions of the brushes on the slip rings and an outside of the alternator.

13. The alternator according to claim 12, wherein the ventilating means has a second air-ventilating port for communicating between an inner space containing the brushes within the brush holder and the outside of the alternator.

14. The alternator according to claim 13, wherein the through hole communicates the second air-ventilating port and the inner space containing the brushes.

15. The alternator according to claim 14, wherein the ventilating means comprises sealing members giving a sealing performance to the inner space containing the slid portions of the brushes on the slip rings, one of the sealing members being placed between the brush holder and the rear cover, wherein the sealing member placed between the brush holder and the rear cover has first and second openings communicating to the first and second air-ventilating ports, respectively.

16. The alternator according to claim 15, wherein the sealing members consist of a first sealing member and a second sealing member, the first sealing member serving as the sealing member having the first and second openings communicating to the first and second air-ventilating ports, respectively, and the first and second sealing members are arranged on sides of an assembly consisting of both the brush holder and the slip ring cover in an axial direction of the rotary shaft and are formed to have openings through which the rotary shaft passes, respectively, wherein the opening of the first sealing member for passing the rotary shaft serves as the first opening of the first sealing member.

17. The alternator according to claim 16, wherein the second air-ventilating port is assigned to charge air from the outside of the alternator and the first air-ventilating port is assigned to discharge of the air to the outside of the alternator.

18. An alternator to be mounted on a vehicle, comprising:

slip rings fixed on a rotary shaft and rotatable together with the rotary shaft;

brushes slidable on the slip rings;

a brush holder accommodating the brushes therein;

a slip-ring cover covering the slip rings as well as the brush holder;

a rear cover covering electronic components including the brushes, and sealing members giving a sealing performance to an inner space containing slid portions of the brushes on the slip rings;

wherein the rear cover, the brush holder, and the sealing member have a ventilating passage for positively causing an flow of air from the inner space containing the slid portions of the brushes on the slip rings to an outside of the alternator.

* * * * *